(12) United States Patent
Iseki et al.

(10) Patent No.: US 9,023,140 B2
(45) Date of Patent: May 5, 2015

(54) INK JET INK SET AND INK JET RECORDING SYSTEM

(71) Applicant: Seiko Epson Corporation, Tokyo (JP)

(72) Inventors: Hiromi Iseki, Shiojiri (JP); Chie Maruyama, Matsumoto (JP); Kiyohiko Takemoto, Matsumoto (JP); Tomohiro Aruga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/173,199

(22) Filed: Feb. 5, 2014

(65) Prior Publication Data

US 2014/0218451 A1    Aug. 7, 2014

(30) Foreign Application Priority Data

Feb. 5, 2013    (JP) .................. 2013-020170

(51) Int. Cl.
*C09D 11/02* (2014.01)
*C09D 11/328* (2014.01)
*C09D 11/40* (2014.01)

(52) U.S. Cl.
CPC .............. *C09D 11/328* (2013.01); *C09D 11/40* (2013.01)
USPC ................... 106/31.59; 106/31.27; 106/31.58

(58) Field of Classification Search
CPC ..................................... C09D 11/40
USPC ............................ 106/31.27, 31.59
See application file for complete search history.

(56) References Cited

U.S. PATENT DOCUMENTS 7,429,293 B2 * 9/2008 Cai ..................... 106/31.89
2014/0125743 A1 5/2014 Aruga

FOREIGN PATENT DOCUMENTS

CN  103804992 A  5/2014
JP  2011-042104 A  3/2011

* cited by examiner

*Primary Examiner* — Veronica F Faison
(74) *Attorney, Agent, or Firm* — Nutter McClennen & Fish LLP; John J. Penny, Jr.

(57) ABSTRACT

An ink jet ink set, at least has a cyan ink, a magenta ink, and a yellow ink, in which the cyan ink contains at least either one of C.I. Acid Blue 9 or C.I. Direct Blue 199, the magenta ink contains at least either one of C.I. Acid Red 249 or C.I. Reactive Red 141, the yellow ink contains at least either one of C.I. Direct Yellow 86 or C.I. Direct Yellow 132, and the cyan ink, the magenta ink, and the yellow ink all contain an alkylene oxide adduct of acetylene glycol having 12 or more carbon atoms in the main chain, acetylene glycol having 10 or more carbon atoms in the main chain, and polyoxy alkylene alkyl ether.

15 Claims, 3 Drawing Sheets

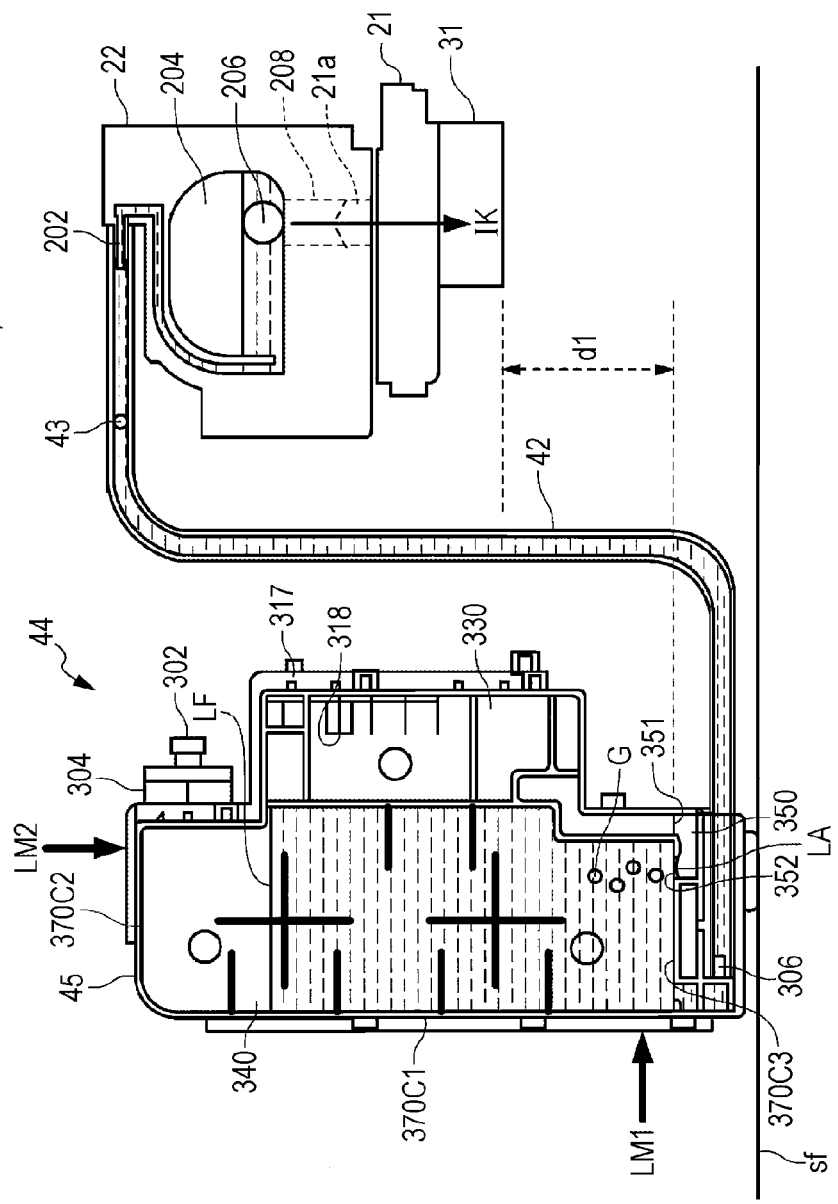

INK JET INK SET AND INK JET RECORDING SYSTEM

BACKGROUND

1. Technical Field

The present invention relates to an ink jet ink set and an ink jet recording system.

2. Related Art

Heretofore, recording employing an ink jet recording method has been performed by supplying ink to a print head, discharging small ink droplets to cause the small ink droplets to fly to thereby make the small ink droplets adhere onto recording media, such as paper. When discharging the ink, poor discharge sometimes occurs due to the generation of air bubbles in the ink and the like. Then, various techniques of degassing the ink using a degassing device or the like to remove the air bubbles to thereby stably discharge the ink have been proposed.

For example, JP-A-2011-42104 aims at providing an ink jet image forming method which includes continuously supplying a large amount of ink in just proportion to an ink head which drives at a high frequency and also in which destabilization of ink discharge from the ink head due to cavitation generated in the ink supply, image defects caused thereby, and a reduction in density are suppressed. JP-A-2011-42104 discloses an ink jet image forming method including transferring an ink, which is an aqueous dye ink containing an aqueous dye, ion exchanged water, and an organic solvent, having a surface tension of 45 mN/m or more, and having a number of contained solid particles filtered through a filtration material with a filtration accuracy of 0.5 μm and having a particle diameter as measured by a particle counter of 0.5 μm or more of 10000 (pieces/10 ml) pieces or less, from an ink container to a storage tank once, pumping the ink with a liquid feed pump, supplying the ink as it is or after filtering the ink with a filtration material with a filtration accuracy of 0.5 μm to an ink jet head through a degassing device in a state where, as the number of the contained solid particles, the number of the contained solid particles having a particle diameter as measured by a particle counter of 0.5 μm or more is 10000 (pieces/10 ml) or less, and then discharging the ink from the ink jet head to a printing medium to form an image on the printing medium.

However, a commercially-available ink tank is relatively less expensive but, in the commercially-available ink tank, ink and air contact each other due to the structure. Even when an open type ink cartridge which is generally used as a commercially-available ink cartridge is charged with degassed ink, the air gradually dissolves into the ink. When the degassed ink disclosed in JP-A-2011-42104 passes through the ink tank and the open-type ink cartridge described above, air dissolves into the ink, and therefore the degassing becomes meaningless, which results in a problem in that poor discharge occurs.

As the causes of the poor discharge, not only air bubbles but clogging of nozzles which discharges ink is also mentioned. Therefore, the use of an ink which is excellent in clogging resistance is an also important. When the poor discharge occurs, the weight of ink droplets adhering to a recording medium does not reach a desired weight, and, as a result, the color reproduction properties sometimes decrease.

SUMMARY

Then, the invention has been made in order to at least partially solve the above-described problems. It is one of the objects of the invention to provide an ink jet ink set which has inks each excellent in initial filling properties and continuous printing stability and is excellent in color reproduction properties and clogging resistance even in the case of an ink composition which is hardly degassed (for example, a dissolved nitrogen amount of 5 ppm or more) or an ink composition which is not degassed at all (for example, a dissolved nitrogen amount of 7 ppm or more) and an ink jet recording system employing the ink set.

The present inventors have conducted extensive research in order to solve the above-described problems. As a result, the present inventors have found that the above-described problems can be solved when the ink jet ink set has inks of predetermined compositions, and then have accomplished the invention.

More specifically, the invention is as follows.

[1]

An ink jet ink set, at least having a cyan ink, a magenta ink, and a yellow ink, in which the cyan ink contains at least either one of C.I. Acid Blue 9 or C.I. Direct Blue 199, the magenta ink contains at least either one of C.I. Acid Red 249 or C.I. Reactive Red 141, the yellow ink contains at least either one of C.I. Direct Yellow 86 or C.I. Direct Yellow 132, and the cyan ink, the magenta ink, and the yellow ink contain an alkylene oxide adduct of acetylene glycol having 12 or more carbon atoms in the main chain, acetylene glycol having 10 or more carbon atoms in the main chain, and polyoxy alkylene alkyl ether.

[2]

The ink jet ink set according to [1] above, in which the polyoxy alkylene alkyl ether has a HLB value of 11 to 16.

[3]

The ink jet ink set according to [1] or [2] above, in which the alkylene oxide adduct of the acetylene glycol having 12 or more carbon atoms in the main chain is an ethylene oxide adduct.

[4]

The ink jet ink set according to any one of [1] to [3] above, in which the polyoxy alkylene alkyl ether is contained in a proportion of 0.10 to 0.50 in terms of mass ratio when the total content of the alkylene oxide adduct of the acetylene glycol having 12 or more carbon atoms in the main chain and the acetylene glycol having 10 or more carbon atoms in the main chain is 1.

[5]

The ink jet ink set according to any one of [1] to [4] above, in which the alkylene oxide adduct of the acetylene glycol having 12 or more carbon atoms in the main chain has a HLB value of 8 to 15.

[6]

The ink jet ink set according to any one of [1] to [5] above, in which the acetylene glycol having 10 or more carbon atoms in the main chain has a HLB value of 7 or less.

[7]

An ink jet recording system, having an ink containing vessel containing the inks of the ink jet ink set according to any one of [1] to [6] above, an ink jet recording head which discharges the inks, and an ink supply path which supplies the inks from the ink containing vessel to the head, and the ink containing vessel has an ink containing chamber for containing the inks and an air introduction flow path which introduces air into the ink containing chamber through the inks contained in the ink containing chamber.

[8]

The ink jet recording system according to [7] above, in which the ratio (A/B) of the area (A) of the horizontal cross section inside the ink containing chamber when supplying the inks to the head and the area (B) of the cross section of the ink supply path is 300 or more.

[9]

The ink jet recording system according to [7] or [8] above, in which the ratio (C/B) of the area (C) of the horizontal cross section inside the ink containing chamber when supplying the inks to the ink containing chamber and the area (B) of the cross section of the ink supply path is 900 or more.

[10]

The ink jet recording system according to any one of [7] to [9] above, in which the ratio (C/A) of the area (A) of the horizontal cross section inside the ink containing chamber when supplying the inks to the head and the area (C) of the horizontal cross section inside the ink containing chamber when supplying the inks to the ink containing chamber is 2.5 or more.

BRIEF DESCRIPTION OF THE DRAWINGS

The invention will be described with reference to the accompanying drawings, wherein like numbers reference like elements.

FIG. 3 is a schematic view for explaining the principle of ink supply from an ink tank which is an example of an ink containing vessel to a head.

DESCRIPTION OF EXEMPLARY EMBODIMENTS

Figure 1:
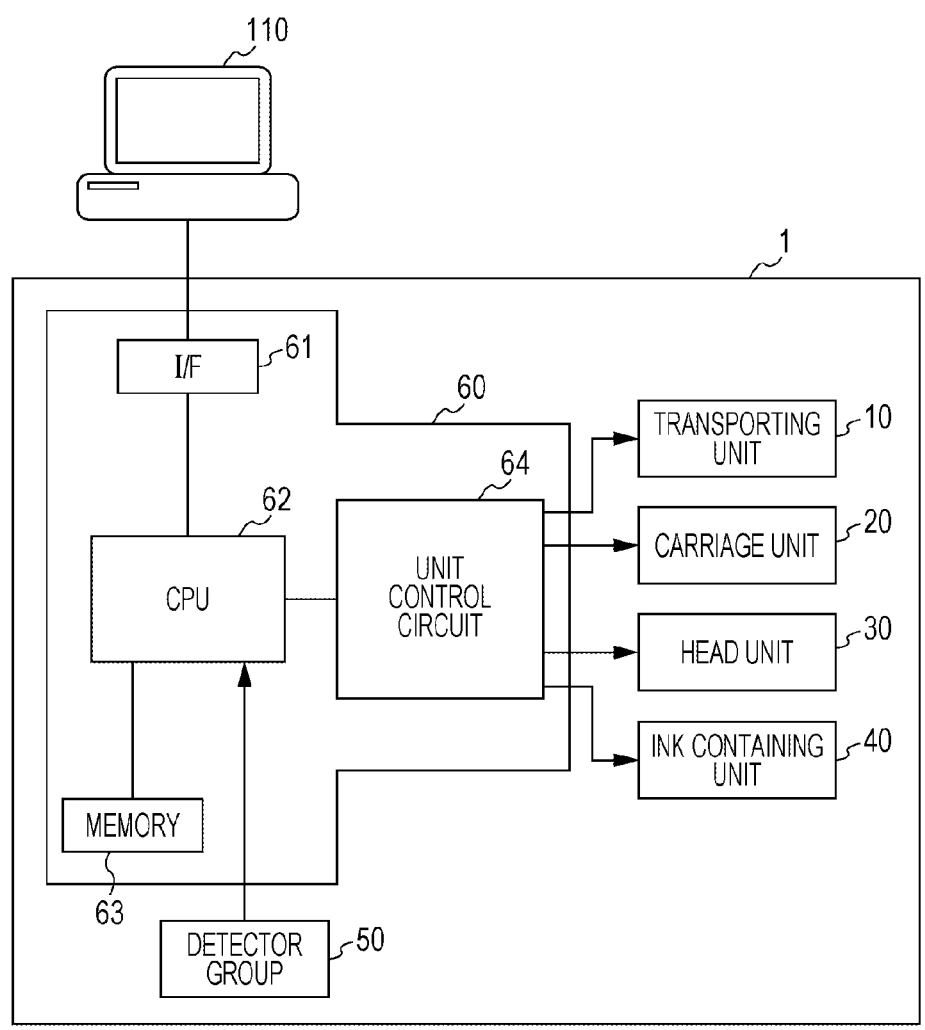
FIG. 1 is a block diagram illustrating the entire configuration of an ink jet recording device having an ink jet recording system (hereinafter also simply referred to as a "recording device" or a "printer").

Hereinafter, a preferable embodiment (hereinafter referred to as "this embodiment") of the invention is described in detail with reference to the drawings as required. The embodiment described below describes an example of the invention. The invention is not limited to the following embodiment and also includes various modifications enforced in the range where the gist of the invention is not altered. In the drawings, the same components are designated by the same reference numerals and duplicated descriptions are omitted. The positional relationship, such as left, right, top, and bottom, is based on the positional relationship illustrated in the drawings unless otherwise specified. In the drawings, the scale is altered as appropriate in each component (member) in such a manner that each component can be recognized on the drawings. This embodiment is not limited only to the number, shape, and the size ratio of the components illustrated in the drawings and the relative positional relationship of each component.

1. Ink Jet Ink Set

An ink jet ink set according to this embodiment is an ink jet ink set at least having a cyan ink, a magenta ink, and a yellow ink. The cyan ink contains at least either one of C.I. Acid Blue 9 or C.I. Direct Blue 199, the magenta ink contains at least either one of C.I. Acid Red 249 or C.I. Reactive Red 141, the yellow ink contains at least either one of C.I. Direct Yellow 86 or C.I. Direct Yellow 132, and the cyan ink, the magenta ink, and the yellow ink all contain an alkylene oxide adduct of acetylene glycol having 12 or more carbon atoms in the main chain, acetylene glycol having 10 or more carbon atoms in the main chain, and polyoxy alkylene alkyl ether. Such an ink jet ink set is excellent initial filling properties and continuous printing stability and also excellent in color reproduction properties and clogging resistance as an ink set. Hereinafter, components contained in each ink are described in detail. When components common to the cyan ink, the magenta ink, and the yellow ink are described, the inks are simply referred to as an "ink jet ink" in the description.

1.1. Colorant 1.1.1. Colorant Contained in Cyan Ink

The cyan ink according to this embodiment contains at least either one of C.I. Acid Blue 9 or C.I. Direct Blue 199. Due to the fact that the cyan ink contains at least either one of C.I. Acid Blue 9 or C.I. Direct Blue 199, particularly the clogging resistance further improves. The cyan ink may also contain a colorant other than the colorants above insofar as the objects of the invention can be achieved.

1.1.2. Colorant Contained in Magenta Ink

The magenta ink according to this embodiment contains at least either one of C.I. Acid Red 249 or C.I. Reactive Red 141. Due to the fact that the magenta ink contains at least either one of C.I. Acid Red 249 or C.I. Reactive Red 141, particularly the color reproduction properties further improve. The magenta ink may also contain a colorant other than the colorants above insofar as the objects of the invention can be achieved.

1.1.3. Colorant Contained in Yellow Ink

The yellow ink according to this embodiment contains at least either one of C.I. Direct Yellow 86 or C.I. Direct Yellow 132. Due to the fact that the yellow ink contains at least either one of C.I. Direct Yellow 86 or C.I. Direct Yellow 132, particularly the color reproduction properties and the moisture resistance further improve. The yellow ink may also contain a colorant other than the colorants above insofar as the objects of the invention can be achieved.

The ink jet ink set of this embodiment is not particularly limited insofar as the cyan ink, the magenta ink, and the yellow ink are at least contained and may have an ink containing another coloring material. In the following explanation, the "ink jet ink" refers to each of the cyan ink, the magenta ink, and the yellow ink. When the ink jet ink set has an ink containing another coloring material other than the cyan ink, the magenta ink, and the yellow ink, the ink containing another coloring material may be or may not be an ink applicable to the "ink jet ink".

1.2. Alkylene Oxide Adduct of Acetylene Glycol Having 12 or More Carbon Atoms in Main Chain The ink jet ink for use in this embodiment contains an alkylene oxide adduct of acetylene glycol having 12 or more carbon atoms in the main chain (hereinafter also simply referred to as an "AO adduct"). The "main chain" in this specification means the main chain of the acetylene glycol determined based on the IUPAC nomenclature.

The AO adduct gives wettability to the ink jet ink against foreign substances which may serve as a cause of the generation of air bubbles in polymer members, such as rubber and plastic, constituting an ink flow path and the inks. Therefore, the use of the ink jet ink containing the AO adduct can suppress remaining of air bubbles generated in ink filling. Thus, the initial filling properties of the ink improve and both the growth of the remaining air bubbles and the dot omissions resulting from the separation of the air bubbles adhering to the flow path surface can be prevented, and therefore, the continuous printing stability improves.

The AO adduct is excellent in solubility in the ink jet ink. The solubility in an ink jet ink of acetylene glycol having 10 or more carbon atoms in the main chain described later is also improved. Thus, the ink jet ink for use in this embodiment achieves both solubility and defoaming properties.

The HLB (Hydrophile-Lipophile Balance) value of the AO adduct is preferably 8 to 15 and more preferably 10 to 13. When the HLB value is within the range above, the wettability against foreign substances which may serve as a cause of the generation of air bubbles tends to be further excellent. The HLB value as used in this specification is defined by the Griffin method.

The AO adduct is not particularly limited and, specifically, a compound represented by the following formula (1) is mentioned.

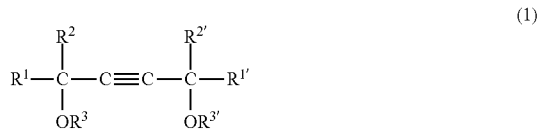

(1)

In Formula (1) above, $R^1$, $R^{1'}$, $R^2$, and $R^{2'}$ mutually independently represent a straight chain or branched chain alkyl group having 1 to 5 carbon atoms. The number of carbon atoms of the acetylene glycol main chain of the AO adduct represented by Formula (1) is 12 or more and preferably 12 or more and 14 or less. In Formula (1), —$OR^3$ and —$OR^{3'}$ mutually independently represent —OH or —$O(C_mH_{2m}O)_n$H. However, the case where both —$OR^3$ and —$OR^{3'}$ represent —OH is excluded. Herein, m represents an integer of 1 to 5. n is a value of 0.5 to 25 containing a decimal number, and indicates the average polymerization degree of the added alkylene oxide ($C_mH_{2m}O$).

The total additional mole number (Total of $R^3$ and $R^{3'}$) of the alkylene oxide unit is preferably 2 to 40 mol. Due to the fact that the total additional mole number is within the range above, the static and dynamic surface tension can be made small, and the initial filling properties tend to be better.

The AO adduct is not particularly limited and specifically includes an ethoxylate of 2,5,8,11-tetramethyl-6-dodecyn-5,8-diol, an ethoxylate of 5,8-dimethyl-6-dodecyn-5,8-diol, and OLFINE EXP4300 (Product name, manufactured by Nissin Chemical Industry CO., Ltd., Number of carbon atoms of 12, Ethylene oxide adduct).

The ink jet ink for use in this embodiment preferably contains an ethylene oxide adduct or a propylene oxide adduct of acetylene glycol having 12 or more carbon atoms in the main chain and more preferably contains an ethylene oxide adduct of acetylene glycol having 12 or more carbon atoms in the main chain. The ethylene oxide adduct of the acetylene glycol having 12 or more carbon atoms in the main chain can be more stably present in the ink jet ink and the wettability against foreign substances which may serve as a cause of the generation of air bubbles tends to be more excellent. Therefore, the initial filling properties of the ink jet ink tend to be more excellent.

The AO adducts may be used singly or in combination of two or more kinds thereof. The content of the AO adduct is preferably 0.05 to 0.30% by mass and more preferably 0.15 to 0.30% by mass based on the total mass (100% by mass) of the ink jet ink. Due to the fact that the content is within the range above, the initial filling properties tend to be better.

1.3. Acetylene Glycol Having 10 or More Carbon Atoms in Main Chain

The ink jet ink for use in this embodiment contains acetylene glycol having 10 or more carbon atoms in the main chain. The acetylene glycol having 10 or more carbon atoms in the main chain is excellent in defoaming properties and can effectively remove air bubbles generated during ink introduction to an ink containing vessel and the like. Thus, the initial filling properties and the continuous printing stability improve.

The HLB value of the acetylene glycol having 10 or more carbon atoms in the main chain is preferably 7 or less, more preferably 5 or less, and still more preferably 4 or less. The lower limit value is preferably 3 or more. When the HLB value is within the range above, the defoaming properties tend to be more excellent.

The acetylene glycol having 10 or more carbon atoms in the main chain is not particularly limited and specifically includes acetylene glycol represented by the following formula (2).

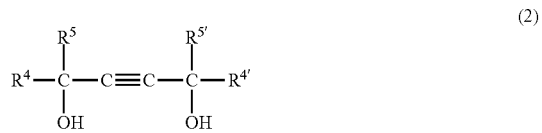

(2)

In Formula (2) above, $R^4$, $R^{4'}$, $R^5$, and $R^{5'}$ mutually independently represent a straight chain or branched chain alkyl group having 1 to 5 carbon atoms. The number of carbon atoms of the acetylene glycol main chain is 10 or more and preferably 10 or more and 14 or less.

The acetylene glycol having 10 or more carbon atoms in the main chain is not particularly limited and specifically 2,5,8,11-tetramethyl-6-dodecyn-5,8-diol (manufactured by Air Products Company, Inc.; Surfynol DF110D), 5,8-dimethyl-6-dodecyn-5,8-diol, 2,4,7,9-tetramethyl-5-decyne-4,7-diol (manufactured by Air Products Company, Inc.; Surfynol 104PG50), and 4,7-dimethyl-5-decyne-4,7-diol are preferably mentioned.

The acetylene glycols having 10 or more carbon atoms in the main chain may be used singly or in combination of two or more kinds thereof. The content of the acetylene glycol having 10 or more carbon atoms in the main chain is preferably 0.05 to 0.30% by mass and more preferably 0.10 to 0.20% by mass based on the total mass (100% by mass) of the ink jet ink. Due to the fact that the content is within the range above, the continuous printing stability tends to be more excellent.

The total content of the acetylene glycol having 10 or more carbon atoms in the main chain and the above-described AO adduct (hereinafter collectively also referred as an "acetylene glycol compound") is preferably 0.1 to 0.6% by mass and more preferably 0.1 to 0.5% by mass. Due to the fact that the content is within the range above, the solubility in water becomes better, so that the generation of an aggregate when compounding the acetylene glycols can be more effectively prevented.

As the mass ratio of the content of the acetylene glycol having 10 or more carbon atoms in the main chain and the content of the above-described AO adduct, the content of the acetylene glycol having 10 or more carbon atoms in the main chain is preferably 0.5 to 2.5, more preferably 0.5 to 2.0, and still more preferably 0.5 to 1.5 when the content of the AO adduct is 1. Due to the fact that the mass ratio is within the range above, the initial filling properties and the continuous printing stability tend to be more excellent.

1.4. Polyoxy Alkylene Alkyl Ether

The ink jet ink for use in this embodiment contains polyoxy alkylene alkyl ether. The polyoxy alkylene alkyl ether acts as a solubilizing agent which dissolves or disperses the AO adduct and the acetylene glycol having 10 or more carbon atoms in the main chain described above in the ink jet ink. All the acetylene glycol compounds have low dynamic surface tension. It can be said that the polyoxy alkylene alkyl ether is a solubilizing agent which does not influence on the low dynamic surface tension.

The HLB value of the polyoxy alkylene alkyl ether is preferably 11 to 16, more preferably 12 to 16, and still more preferably 12 to 15. Due to the fact that the HLB value is within the range above, the initial filling properties and the continuous printing stability tend to be more excellent.

The polyoxy alkylene alkyl ether is not particularly limited and specifically includes a compound represented by the following formula (3).

$$R^6O(C_2H_4O)_w(C_3H_6O)_x(C_2H_4O)_y(C_3H_6O)_zH \quad (3)$$

In Formula (3) above, $R^6$ represents an alkyl group having 1 to 20 carbon atoms, preferably an alkyl group having 5 to 15 carbon atoms, and more preferably an alkyl group having 10 to 15 carbon atoms. w is a value of 1 to 20 and x, y, and z mutually independently represent 0 or values of 1 to 20. w, x, y, and z satisfy $5 \leq w+x+y+z \leq 30$ and preferably satisfy $5 \leq w+x+y+z \leq 25$. By the use of the polyoxy alkylene alkyl ether described above, the storage stability and the continuous printing stability tend to be more excellent.

The polyoxy alkylene alkyl ether is not particularly limited and specifically includes
$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)W(C_3H_6O)_x(C_2H_4O)_w(C_3H_6O)_zH$ (herein w+y=15, x+z=4),
$C_{13}H_{27}O(C_2H_4O)W(C_3H_6O)_x(C_2H_4O)_w(C_3H_6O)_zH$ (herein w+y=15, x+z=4),
$C_{12}H_{25}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{12}H_{25}O(C_2H_4O)_{12}(C_3H_6O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_6O)_{4.5}H$,
$CH_3(CH_2)_9(CH_3)CHO(C_2H_4O)_5(C_3H_6O)_{3.5}H$,
$CH_3(CH_2)_{11}(CH_3)CHO(C_2H_4O)_5(C_3H_6O)_{3.5}H$,
$C_{14}H_{29}O(C_2H_4O)_{14}(C_3H_6O)_2H$,
$C_{11}H_{23}O(C_2H_4O)_8H$,
$C_{10}H_{21}O(C_2H_4O)_{11}H$, and
$C_{12}H_{25}O(C_2H_4O)_{15}H$.

Commercially-available items of polyoxy alkylene alkyl ether are not particularly limited and specifically include
NOIGEN DL-0415 ($R^6O(C_2H_4O)_w(C_3H_6O)_x(C_2H_4O)_y(C_3H_6O)_zH$, "$R^6$": Alkyl having 12 and 13 carbon atoms, w+y=15, x+z=4, HLB value 15.0),
NOIGEN ET-116B ($R^6O(C_2H_4O)_7(C_3H_6O)_{4.5}H$, "$R^6$": Alkyl having 12 and 14 carbon atoms, HLB value 12.0),
NOIGEN ET-106A ($R^6O(C_2H_4O)_5(C_3H_6O)_{3.5}H$, "$R^6$": Alkyl having 12 and 14 carbon atoms, HLB value 10.9),
NOIGEN DH-0300 ($R^6O(C_2H_4O)_2H$, "$R^6$": Alkyl having 14 carbon atoms, HLB value 4.0),
NOIGEN YX-400 ($R^6O(C_2H_4O)_{40}H$, "$R^6$": Alkyl having 12 carbon atoms, HLB value 18.1),
NOIGEN EA-160 ($C_9H_{19}C_6H_4O(C_2H_4O)_{16.8}H$, HLB value 15.4) (all manufactured by Dai-Ichi Kogyo Seiyaku Co., Ltd.), and
EMULGEN 1108 (Product name, manufactured by Kao Corp., $R^6O(C_2H_4O)_8H$, "$R^6$": Alkyl having 11 carbon atoms, HLB value 13.4).

The polyoxy alkylene alkyl ethers may be used singly or in combination of two or more kinds thereof. The content of the polyoxy alkylene alkyl ether is preferably 0.01 to 0.50% by mass and more preferably 0.05 to 0.30% by mass based on the total mass (100% by mass) of the ink jet ink. When the content is within the range above, the storage stability and the continuous printing stability tend to be more excellent.

The polyoxy alkylene alkyl ether is contained in a proportion of preferably 0.10 to 1.0 and more preferably 0.30 to 0.70 in terms of mass ratio when the content of the AO adduct is 1. When the mass ratio is within the range above, the solubility in the ink jet ink of the AO adduct further improves. Thus, the generation of an aggregate which may be produced when the AO adduct is compounded is further suppressed, and the dissolution stability and the storage stability tend to be more excellent.

The polyoxy alkylene alkyl ether is contained in a proportion of preferably 0.10 to 1.0 and more preferably 0.10 to 0.40 in terms of mass ratio when the total content of the alkylene oxide adduct of the acetylene glycol having 12 or more carbon atoms in the main chain and the acetylene glycol having 10 or more carbon atoms in the main chain is 1. When the mass ratio is within the range above, the solubility in the ink jet ink of the acetylene glycol compound tends to be better. Thus, the generation of an aggregate which may be produced when compounding the polyoxy alkylene alkyl ether and the acetylene glycol compound is further suppressed, and the dissolution stability and the storage stability tend to be more excellent.

1.5. Other Components

The cyan ink, the magenta ink, the yellow ink, and the inks containing other coloring materials for use in this embodiment may contain components other than the components described above. Mentioned as such components are, for example, water, an organic solvent, an antiseptic agent, an antifungal agent, a pH adjuster, a chelating agent, and the like.

1.5.1. Water

The ink jet ink for use in this embodiment may contain water. Water is not particularly limited and includes, for example, one in which ionic impurities are removed as much as possible, such as pure water and ultrapure water, such as ion exchanged water, ultrafiltration water, reverse osmosis water, and distilled water. Moreover, when water which is sterilized by radiation of ultraviolet rays, addition of hydrogen peroxide, and the like is used, the generation of mold or bacteria tends to be able to be prevented when storing the ink over a long period of time.

1.5.2. Organic Solvent

The organic solvent is not particularly limited and includes, for example, 1,2-alkanediols, glycol ethers, polyhydric alcohols, pyrolidone derivatives, and the like. The organic solvents may be used singly or as a mixture of two or more kinds thereof.

The 1,2-alkanediols are not particularly limited and include, for example, 1,2-propanediol, 1,2-butanediol, 1,2-pentanediol, 1,2-hexanediol, 1,2-octanediol, and the like. Since the 1,2-alkanediols have an excellent function of increasing the wettability of the ink against a recording medium for uniformly wetting, an excellent image can be formed on the recording medium. When the 1,2-alkanediols are contained, the content is preferably 1% by mass or more and 20% by mass or less based on the total mass of the ink jet ink.

Mentioned as the glycol ethers are, for example, alkylene glycol monoether, alkylene glycol diether, and the like.

The alkylene glycol monoethers are not particularly limited and include, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and the like.

The alkylene glycol diethers are not particularly limited and include, for example, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

The glycol ethers can be used singly or as a mixture of two or more kinds thereof. The glycol ethers can control the wettability and the permeation speed of the ink to a recording medium. Therefore, a clear image with little density unevenness can be recorded. When the glycol ethers are contained, the content is preferably 0.05% by mass or more and 6% by mass or less based on the total mass of the ink jet ink from the viewpoint of improving the wettability and the permeability to a recording medium to thereby reduce density unevenness, improving the storage stability and the discharge reliability of the ink, and the like.

The polyhydric alcohols are not particularly limited and include, for example, ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylol propane, glycerin, and the like. The polyhydric alcohols can be preferably used from the viewpoint that drying and solidification of the ink on the nozzle surface of the head is suppressed, and clogging, poor discharge, and the like can be reduced. When the polyhydric alcohols are contained, the content is preferably 2% by mass or more and 20% by mass or less based on the total mass of the ink jet ink.

The pyrolidone derivatives are not particularly limited and include, for example, N-methyl-2-pyrolidone, N-ethyl-2-pyrolidone, N-vinyl-2-pyrolidone, 2-pyrolidone, N-butyl-2-pyrolidone, 5-methyl-2-pyrolidone, and the like. The pyrolidone derivatives can be preferably used from the viewpoint of storage stability. These substances can be used singly or as a mixture of two or more kinds thereof. When the pyrolidone derivatives are contained, the content is preferably 0.5% by mass or more and 5% by mass or less based on the total mass of the ink.

1.5.3. Antiseptic/Antifungal Agent

The antiseptic/antifungal agent is not particularly limited and includes, for example, sodium benzoate, sodium pentachlorophenol, sodium 2-pyridinethiol-1-oxide, sodium sorbate, sodium dehydroacetate, 1,2-dibenzinethiazoline-3-on (Proxel CRL, Proxel BND, Proxel GXL, Proxel XL-2, and Proxel TN of ICI), and the like.

1.5.4. pH Adjuster

The pH adjusters are not particularly limited and include, for example, potassium dihydrogen phosphate, disodium hydrogenphosphate, sodium hydroxide, lithium hydroxide, potassium hydroxide, ammonia, diethanolamine, triethanolamine, triisopropanolamine, potassium carbonate, sodium carbonate, sodium hydrogencarbonate, and the like.

1.5.5. Chelating Agent

The chelating agents are not particularly limited and include, for example, ethylenediamine tetraacetate, salts thereof (disodium dihydrogen ethylenediaminetetraacetate and the like), and the like.

1.6. Preparation Method of Ink

The ink jet ink for use in this embodiment is obtained by mixing the components mentioned above in an arbitrary order, and then performing filtration and the like as required to remove impurities. A mixing method of the components, a method of successively adding materials in a container having a stirring device, such as a mechanical stirrer and a magnetic stirrer, and then mixing and stirring the materials is suitably used. As the filtration method, centrifugal filtration, filter filtration, and the like can be performed as required.

1.7. Physical Properties of Ink

Surface Tension

In the ink jet ink for use in this embodiment, the surface tension at 20° C. is preferably 20 mN/m or more and 50 mN/m or less and more preferably 25 mN/m or more and 40 mN/m or less from the viewpoint of the balance between the image quality and the reliability as the ink jet recording ink. The measurement of the surface tension can be achieved by, for example, determining the surface tension when a platinum plate is wetted with the ink in a 20° C. environment using an automatic surface tension meter CBVP-Z (Product name, manufactured by Kyowa Interface Science Co., LTD.).

Viscosity

From the same viewpoint, the viscosity at 20° C. of the ink jet ink for use in this embodiment is preferably 2 mPa·s or more and 15 mPa·s or less and more preferably 2 mPa·s or more and 10 mPa·s or less. The measurement of the viscosity can be achieved by measuring the viscosity in a 20° C. environment using a viscoelasticity tester MCR-300 (Product name, manufactured by Pysica), for example. Dissolved oxygen amount, Dissolved nitrogen amount The ink jet ink for use in this embodiment may be an ink which is hardly degassed (for example, a dissolved oxygen amount or a dissolved nitrogen amount of 5 ppm or more) or an ink which is not degassed at all (for example, a dissolved oxygen amount or a dissolved nitrogen amount of 7 ppm or more). Even when the ink jet ink which is not degassed as described above is used, the initial filling properties and the continuous printing stability are excellent, and therefore the ink jet ink is suitable for the application of the present invention. The dissolved oxygen amount and the dissolved nitrogen amount can be measured by a method described in Examples.

2. Ink Jet Recording System

An ink jet recording system according to this embodiment contains an ink containing vessel containing the inks of the ink jet ink set described above and an ink jet recording head which discharges the inks, and an ink supply path which supplies the inks from the ink containing vessel to the head, in which the ink containing vessel has an ink containing chamber containing the inks and an air introduction flow path which introduces air into the ink containing chamber through the inks contained in the ink containing chamber.

The ink jet recording system according to this embodiment can be enforced using an ink jet recording device. Specifically, the ink jet recording system in provided in the ink jet recording device and performs recording by discharging the ink, which is supplied to the head from the ink containing vessel, to a recording medium from the head.

Hereinafter, the ink jet recording system of this embodiment is described with reference to a case where the ink jet recording system is applied to the ink jet recording device as an example.

2.1. Ink Jet Recording Device

The recording device having the ink jet recording system can be classified into some types according to a system of a recording device and an ink supplying system. As a type of the system of the recording device, a line printer and a serial printer are mentioned, for example. The "line printer" has a line head with a length equivalent to the width of a recording medium, in which the head is not (almost) moved and fixed, and printing is performed by one pass (single pass). On the other hand, the "serial printer" usually performs printing by two passes or more (multipass) while moving a head back and forth (shuttle movement) in a direction orthogonal to a transporting direction of a target recording medium. As the ink supplying system, an on-carriage type serial printer and an off-carriage type serial printer are mentioned, for example.

In the following description, the ink jet recording system and a recording device having the same are described taking the off-carriage type serial printer of the types mentioned above as an example with reference to the drawings. Herein, the "off-carriage type serial printer" is one in which the ink containing vessel, such as an ink tank and an ink cartridge, and a head of the carriage are connected with an ink supply path, such as a tube.

2.1.1. Configuration of Recording Device

Figure 2:
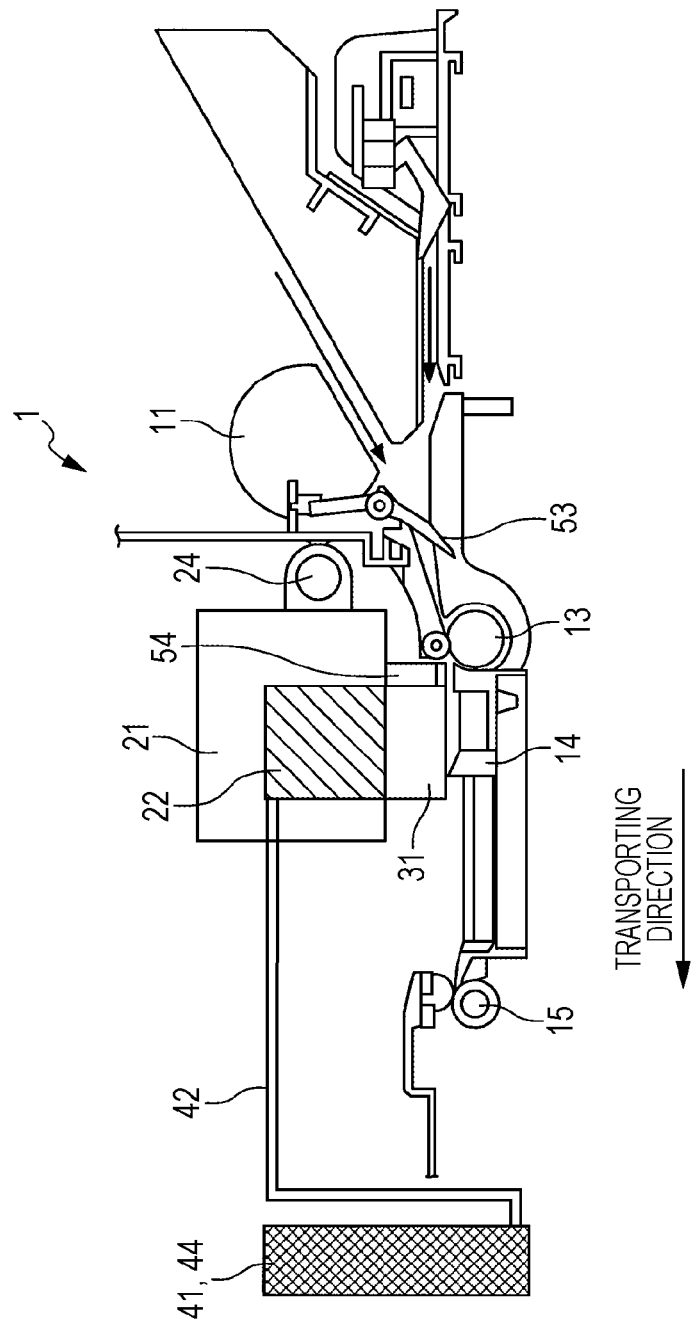
FIG. 2 is a schematic view illustrating the transverse cross section of a printer having the ink jet recording system.

FIG. 1 is a block diagram illustrating the entire configuration of an ink jet recording device (printer 1) having the ink jet recording system. FIG. 2 is a schematic view illustrating the transverse cross section of the printer 1 having the ink jet recording system.

The printer 1 of this embodiment is a device of discharging ink to a recording medium, such as paper, and forming an image on the surface to be recorded of the recording medium.

The printer 1 has a transporting unit 10, a carriage unit 20, a head unit 30, an ink containing unit 40, a detector group 50, and a controller 60. The printer 1 which receives print data from a computer 110 which is an external device controls each unit (the transporting unit 10, the carriage unit 20, the head unit 30, the ink containing unit 40) by the controller 60. The controller 60 controls each unit based on the print data received from the computer 110, and prints an image on a recording medium. The state in the printer 1 is observed by the detector group 50, and the detector group 50 outputs the detection results to the controller 60. The controller 60 controls each unit based on the detection results output from the detector group 50. The transporting unit 10 transports a recording medium in a predetermined direction (hereinafter referred to as a "transporting direction" or a "subscanning direction"). The transporting unit 10 has a paper feed roller 11, a transporting motor (not illustrated), a transporting roller 13, a platen 14, and a paper discharging roller 15. The paper feed roller 11 is a roller for feeding a recording medium inserted into a paper inserting port into the printer 1. The transporting roller 13 is a roller for transporting the recording medium fed by the paper feed roller 11 to a region where printing can be performed, and is driven by a transporting motor. The platen 14 supports the recording medium under printing. The paper discharging roller 15 is a roller for discharging the recording medium to the outside of the printer 1, and is provided at the downstream side in the transporting direction to the region where printing can be performed.

The carriage unit 20 is a movement mechanism for moving, i.e., scanning, a head 31 in a direction crossing the transporting direction (the subscanning direction) (hereinafter referred to as a "movement direction" or a "main scanning direction") while discharging ink to the recording medium which is made to stand still in a recording region. The carriage unit 20 has a carriage 21, a carriage motor (not illustrated), and a subtank (sub-ink tank) 22. The carriage 21 has the subtank 22 and the head 31 and is connected to the carriage motor (not illustrated) through a timing belt (not illustrated). The carriage 21 moves back and forth along a guide shaft 24 by the carriage motor in a state where the carriage 21 is supported by the guide shaft 24 crossing the transporting direction described later. The guide shaft 24 is supported in such a manner that the carriage 21 can move back and forth in the axis line direction of the guide shaft 24. The subtank 22 suppresses a pressure fluctuation of the ink in the head 31 which may be caused due to the back and forth movement of the carriage 21.

Although not illustrated, the subtank 22 may have four subtanks, for example, and may contain ink different in the color in each subtank.

The carriage unit 20 may not have the subtank 22. In this case, the ink containing vessel 41 and the head 31 are connected through an ink supply path 42. The subtank 22 is described in more detail in FIG. 3 described later. When using the on-carriage type serial printer, an ink cartridge may be used in place of the subtank 22.

The head unit 30 discharges ink to a recording medium. The head unit 30 has the head 31 having a plurality of nozzles. The ink jet recording head 31 discharges ink. The head 31 is provided on the carriage 21. Therefore, when the carriage 21 moves in the movement direction, the head 31 also moves in the movement direction. Then, the head 31 discharges ink while moving in the movement direction, whereby an image is formed on the surface to be recorded of the recording medium.

Although not illustrated, the four heads 31 may discharge ink corresponding to the color of ink contained in each of the four subtanks 22, for example.

The ink containing unit 40 contains ink and also supplies the contained ink to the head 31 through the ink supply path. The ink containing unit 40 has the ink containing vessel 41, the ink supply path 42, and a filter 43 (FIG. 3).

The ink containing vessel 41 is disposed at a place different from the place of the carriage 21 and is stored in an ink containing vessel storage portion (not illustrated) provided at the outside of the main body of the printer 1 (outside of the movement range of the carriage 21). The ink containing vessel 41 and the head 31 (carriage 21) are connected by the ink supply path 42. In this case, the ink containing vessel 41 does not move.

The ink containing vessel 41 contains the ink of the ink jet ink set and has an ink containing chamber for containing the ink and an air introduction flow path which introduces air into the ink containing chamber through the ink contained in the ink containing chamber. In other words, the ink containing vessel 41 can also be said to be an ink containing vessel in which air bubbles generate in the ink due to the fact that air is introduced from an air introduction port into the ink contained in the ink containing chamber. The ink containing vessel 41 has a structure such that the atmosphere and ink can contact each other. The ink jet recording system of the embodiment described above allows the ink contained in the ink containing vessel 41 to contain air bubbles. Therefore, according to the ink jet recording system and the recording device of this embodiment having the ink jet recording system, an ink with a large nitrogen dissolved amount containing air bubbles can be contained in the ink containing vessel 41 irrespective of whether or not degassing treatment is performed. Furthermore, the ink containing vessel 41 facilitates a further supply (refilling) of ink. Such an ink containing vessel 41 is not particularly limited insofar as known ink can be contained, and, for example, a (large-capacity) ink tank and an open type ink cartridge are mentioned.

Although not illustrated, the four ink containing vessels 41 may contain the ink corresponding to the color of the ink contained in each of the four subtanks 22. In each ink containing vessel 41, the ink liquid surface can be confirmed from the outside from a predetermined portion. The ink containing vessel 41 is one constituent element of the printer 1 but the spatial restriction is smaller because the ink containing vessel 41 is provided at the outside of the main body of the printer 1. Therefore, the ink containing vessel 41 can contain a larger amount of ink than the subtank 22.

The ink supply path 42 connects the ink containing vessel 41 and the head 31 and supplies the ink from the ink containing vessel 41 to the head 31. The ink supply path 42 can connect the ink containing vessel 41 capable of containing inks different in color and the subtank 22 for containing the ink of the corresponding color. The ink supply path 42 can be formed with a member having flexibility, such as synthetic rubber, and can be a hose or a tube. When the ink is discharged from the head 31 and the ink in the subtank 22 is consumed, the ink in the ink containing vessel 41 is supplied to the subtank 22 through the ink supply path 42. Thus, the printer 1 can continuously perform printing without an interruption over a long period of time.

The ink containing vessel 41 and the ink supply path 42 are described in more detail in FIG. 3 described later.

The filter 43 may be provided in the flow path of the ink supply path 42. When the ink flowing through the ink supply path 42 contains air bubbles, the filter 43 can prevent the inflow of the air bubbles into the head by catching the air bubbles. Thus, both filling the head 31 with the ink and the discharging of the ink from the head 31 are good and both initial filling properties and continuous printing stability are good.

The position where the filter 43 is placed is not particularly limited. For example, the filter 43 may be provided near an outlet port of the ink containing vessel 41 (liquid lead portion 306).

The detector group 50 contains a linear encoder (not illustrated), a rotary encoder (not illustrated), a paper detection sensor 53, an optical sensor 54, and the like. The linear encoder detects the position in the movement direction of the carriage 21. The rotary encoder detects the rotation amount of the transporting roller 13. The paper detection sensor 53 detects the position of the top end of a recording medium, such as paper, under feeding. The optical sensor 54 detects the absence or presence of a target recording medium by a light emitting portion and a light receiving portion attached to the carriage 21. Then, the optical sensor 54 can detect the position of the end of the recording medium while moving by the carriage 21, and can detect the width of the target recording medium. The optical sensor 54 can also detect the top end (which is an end portion at the downstream side in the transporting direction and is also referred to as an "upper end") and the back end (which is an end portion at the upstream side in the transporting direction and is also referred to as a "lower end") of the target recording medium according to a situation.

The controller 60 is a control unit (control portion) for controlling the printer 1. The controller 60 has an interface portion 61, a CPU 62, a memory 63, and a unit control circuit 64. The interface portion 61 transmits and receives data between the computer 110 which is an external device and the printer 1. The CPU 62 is an arithmetic processing unit for controlling the entire printer 1. The memory 63 secures a space for storing the program of the CPU 62, a working space, and the like and has storage elements, such as RAM and EEPROM. The CPU 62 controls each unit through the unit control circuit 64 according to the program stored in the memory 63.

When performing recording, a dot formation operation of discharging the ink from the head 31 while moving in the movement direction and a transporting operation of transporting a recording medium in the transporting direction are alternately repeated by the control of the controller 60 described later, and then an image constituted by a plurality of dots can be printed on the target recording medium.

Thus, the ink jet recording device of this embodiment having the ink jet recording system described above forms an image in a region facing the head 31 of the recording medium.

2.1.2. Operation of Recording Device

Mentioned as the operation of the recording device of this embodiment are a recording operation of attaching ink to a recording medium and forming an image and a transporting operation of transporting a recording medium. The recording device of this embodiment performs recording by alternately performing the recording operation and the transporting operation. In recording, the recording medium is not transported and is held by the platen 14 positioned in the recording region. The recording operation includes, but not limited to the following operation, an ink supply operation of supplying ink from the ink containing vessel 41 to the head 31, an air introduction operation of introducing the atmosphere (air) into the ink containing vessel 41 for the purpose of stably supplying the ink to the head 31 from the ink tank 44, and a discharge operation of discharging the ink to a recording medium from the head 31, for example. A desired image can be formed in the region facing the head 31 in the recording medium by such operations of the recording device.

The ink supply operation described above includes an operation of further supplying (refilling) ink corresponding to the ink which is supplied and reduced to the ink containing vessel 41. The operation of the recording device of this embodiment can be referred to as an ink jet recording method utilizing the ink jet recording system. Each operation included in the operations of the recording device described above can be referred to as a "process".

Hereinafter, the recording medium for use in the recording operation in this embodiment is described, and subsequently an example of the recording operation is described.

Recording Medium

The recording medium is not particularly limited and includes, for example, an ink-absorbing recording medium. The ink-absorbing recording medium is not particularly limited, and includes, for example, plain paper, such as an electronic photograph paper with high permeability of an aqueous ink, an ink jet paper (a paper exclusive for ink jet having an ink absorbing layer constituted by silica particles and alumina particles or an ink absorbing layer constituted by a hydrophilic polymer, such as polyvinyl alcohol (PVA) and polyvinyl pyrolidone (PVP)), an art paper, a coated paper, a cast paper, and the like which have relatively low permeability of an aqueous ink and are used for general offset printing.

Ink Supply Operation

The recording operation in this embodiment includes an ink supply operation. The ink supply operation is one for supplying ink from the ink containing vessel 41 to the head 31, and can utilize the ink jet recording system of the embodiment described above. The ink supply operation is described in detail later.

Air Introduction Operation

The recording operation in this embodiment may further include an air introduction operation. The air introduction operation assists the ink supply operation, and can utilize the ink jet recording system of this embodiment. For example, in the recording operation utilizing the ink jet recording system provided with the ink containing vessel having the air introduction flow path for introducing air and having the structure of generating air bubbles in the ink as described above, the air introduction operation is performed. The air introduction operation introduces the atmosphere (air) into the ink containing vessel 41 for the purpose of stably supplying the ink to the head 31 from the ink tank 44. The air introduction operation is described in detail later.

Discharge Operation

The recording operation in this embodiment includes a discharge operation. The discharge operation is one for discharging ink liquid droplets onto a recording medium by an ink jet recording method, and forming an image. As the discharging method, known methods can be used. In particular, when a method of discharging liquid droplets from nozzles utilizing vibration of a piezoelectric element (recording method using a head of forming ink droplets by mechanical deformation of an electrostriction element) or a method of generating air bubbles in a head using a heating element and discharging ink from nozzles is used, good recording can be performed. Various discharging conditions, such as the temperature and the time of the discharging and the viscosity of the ink to be discharged, are not particularly limited.

Hereinafter, the ink supply operation and the air introduction operation among the recording operations in this embodiment are mainly described in detail.

FIG. 3 is a schematic view for explaining the principle of the ink supply from the ink tank 44 which is an example of the ink containing vessel 41 to the head 31. A technique of the ink supply illustrated in FIG. 3 is one utilizing the principle of the Mariotte's bottle when briefly described and is one in which the head 31 and the ink tank 44 are connected through the subtank 22 and the ink supply path 42 provided in the carriage 21 and the ink is sucked from the ink tank 44 and supplied to the head 31 by generating a negative pressure in the subtank 22. FIG. 3 mainly schematically illustrates the inside of the ink tank 44, the ink supply path 42, and the subtank 22.

The printer 1 is placed on a predetermined horizontal surface sf. A liquid lead portion 306 of the ink tank 44 and a liquid receiving portion 202 of the subtank 22 are connected through the ink supply path 42.

The subtank 22 is formed with a synthetic resin, such as polystyrene and polyethylene. The subtank 22 has an ink storage chamber 204, an ink flowing path 208, and a filter 206. Into the ink flowing path 208, an ink supply needle 21a of the carriage 21 is inserted. When impurities, such as foreign substances, are mixed in the ink flowing through the ink flowing path 206, the filter 206 prevents the inflow of the impurities into the head 31 by catching the impurities. The ink of the ink storage chamber 204 flows through the ink flowing path 208 and the ink supply needle 21a by the suction from the head 31, and then is supplied to the head 31. The ink supplied to the head 31 is discharged to a recording medium through nozzles, and then attached thereto, thereby forming an image (the discharge operation described above).

Herein, also in the case where the subtank 22 is provided between the ink containing vessel 41 and the head 31 as in this embodiment, the ink supply path 42 connects the ink containing vessel 41 and the head 31, and therefore the ink supply path 42 is present also in the subtank 22. Therefore, in the case described above, both the filter 43 and the filter 206 are equivalent to a filter to be provided in the ink supply path 42.

The ink tank 44 supplies an ink to the head 31 of the printer 1 utilizing the principle of the Mariotte's bottle. The external surface of the ink tank 44 contains a first wall 370C1, a second wall (upper surface wall) 370C2, and a bottom surface wall 370C3. The ink tank 44 has an air introduction flow path and an ink flow path therein. The air introduction flow path is a flow path for introducing air from an atmosphere opening port 317 to an ink containing chamber 340 passing through an atmosphere introduction port 318 via an atmosphere flow path which is not illustrated. The ink flow path is a flow path for performing injection (including "refilling", which applies to the following description) of the ink from a liquid injection path 304 to the liquid lead portion 306 passing through the ink containing chamber 340.

First, the air introduction flow path is a flow path to be used in the air introduction operation. The air introduction flow path is constituted by the atmosphere opening port 317 which opens to the outside (atmosphere), an air containing chamber 330 in which the atmosphere introduction port 318 serves as one end and an air chamber side opening 351 serves as the other end, and a liquid chamber communication path 350 in which the air chamber side opening 351 serves as one end and an air introduction port 352 serves as the other end. The atmosphere opening port 317 communicates with the atmosphere. The air containing chamber 330 opens in the atmosphere introduction port 318 serving as one end. The atmosphere opening port 317 and the atmosphere introduction port 318 communicate with each other through a flow path which is not illustrated. More specifically, the air containing chamber 330 communicates with the outside (atmosphere). In the liquid chamber communication path 350, the air chamber side opening 351 serving as one end opens in the air containing chamber 330 and the air introduction port 352 serving as the other end opens in the ink containing chamber 340. More specifically, the air containing chamber 330 communicates with the ink containing chamber 340. The flow path cross-sectional area of the liquid chamber communication path 350 is preferably small such that a meniscus (liquid surface crosslinking) can be formed.

Thus, in the air introduction flow path described above, the air introduction port 352 serving as one end opens in the ink containing chamber 340 and the atmosphere opening port 317 serving as the other end opens to the outside. More specifically, in the use state of the ink tank 44 described later, a liquid surface directly contacting the atmosphere is formed in the liquid chamber communication path 350 (in detail, near the air introduction port 352), and, by introducing air (air bubbles) into the ink in the ink containing chamber 340 from the air introduction port 352, air (air bubbles G) is introduced into the ink containing chamber 340. In other words, air is introduced into the ink containing chamber 340 through the ink from the air introduction flow path. Thus, the ink can be stably supplied from the ink tank 44 to the head 31 as described later. More specifically, the air introduction operation described so far is performed for the purpose of stabilizing the ink supply operation described later.

On the other hand, the ink flow path described above is used in the ink supply operation described above. These ink supply operations are performed with a reduction in the ink storage amount of the ink tank 44 resulting from the discharge operation from the head 31 and are stably performed by the air introduction operation.

Herein, the ink tank 44 has a use state and an injection state. The "use state" refers to a state of the ink tank 44 placed on the horizontal surface when supplying the ink to the head 31 of the printer 1. In other words, in the use state, the liquid injection path 304 opens in a horizontal direction (The opening is closed by a plug member 302). FIG. 3 illustrates the ink tank 44 in the use state. In the use state, the ink containing chamber 340 and the air containing chamber 330 are horizontally positioned in a line. In the use state, the air introduction port 352 is positioned below relative to the liquid surface of the liquid contained in the ink containing chamber 340. On the other hand, the "injection state" refers to a state of the ink tank 44 placed on the horizontal surface when the ink is injected into the ink tank 44. In other words, in the injection state, the liquid injection path 304 opens upward. In the injection state, the ink containing chamber 340 and the air containing chamber 330 are positioned in a line in a perpendicular direction. In the injection state, the air introduction port 352 is positioned above the liquid surface of the liquid contained in the ink containing chamber 340 in the case where the liquid with a liquid amount when the liquid surface of the liquid contained in the ink containing chamber 340 in the use state is located on a straight line LM1 ("First state display line LM1") is contained in the ink containing chamber 340.

In the injection state described above, a user may stop the refilling with the ink when the ink liquid surface reaches near a straight line LM2 ("Second state display line LM2") which becomes horizontal in the injection state. Thus, after the ink is injected into the ink containing chamber 340 from the liquid injection path 304, the liquid injection path 304 is sealed by the plug member 302. Furthermore, the ink containing chamber 340 is maintained at a negative pressure by sucking the ink in the ink containing chamber 340 from the head 31.

In the use state described above, the air introduction port 352 is positioned below relative to the first state display line LM1. In FIG. 3, the air introduction port 352 is formed on the bottom surface wall 370C3 positioned at a lower side with the ink containing chamber 340 interposed therebetween in the use state of the container main body 45 which defines and forms the ink containing chamber 340. Thus, even when the ink in the ink containing chamber 340 is consumed and the liquid surface of the ink containing chamber 340 is lowered, a liquid surface (atmosphere contact surface) LA contacting the atmosphere is maintained at a fixed height over a long period of time (time in which the ink liquid surface reaches the first state display line LM1). In the use state, the air introduction port 352 is disposed to be lower than the head 31. Thus, a hydraulic head difference d1 arises. In the use state, the hydraulic head difference d1 in a state where the atmosphere contact surface LA which is a meniscus is formed near the atmosphere introduction port 352 of the liquid chamber communication path 350 is also referred to as a "stationary hydraulic head difference dl" in the following description.

Due to the fact that the ink in the ink storage chamber 204 is sucked by the head 31, the pressure of the ink storage chamber 204 becomes a predetermined negative pressure or higher. When the pressure of the ink storage chamber 204 becomes a predetermined negative pressure or higher, the ink in the liquid containing chamber 340 is supplied to the ink storage chamber 204 via the ink supply path 42. More specifically, the amount of the ink equivalent to the amount of the ink flowing to the head 31 is automatically further supplied (refilled) to the ink storage chamber 204 from the liquid containing chamber 340. In other words, the ink is supplied from the liquid containing chamber 340 to the ink storage chamber 204 due to the fact that the suction force (negative pressure) from the head 31 side becomes larger by a certain amount than the hydraulic head pressure dl caused by a height difference in the perpendicular direction between the air containing chamber 330 in the ink tank 44, i.e., the atmosphere contact liquid surface (ink liquid surface) LA contacting the atmosphere, and the nozzle surface of the head 31.

Herein, generally, when the liquid surface (ink liquid surface LF of FIG. 3) of the ink contained in the ink containing chamber is sufficiently large, the ink discharge stability may not be sufficiently obtained. For example, when the ratio (A/B) of the area (A) of the horizontal cross section inside the ink containing chamber 340 in the use state (state where the ink is supplied to the head) described above and the area (B) of the cross section of the ink supply path 42 which supplies ink to the head 31 is 300 or more, the ink discharge stability tends to decrease. Even in such a case, according to the ink jet recording system according to this embodiment employing the above-described ink jet ink, the generation of an aggregate can be suppressed, and even when an aggregate is generated, the aggregate can be easily re-dispersed. The ink discharge stability becomes more difficult to obtain as an increase in the ratio (A/B). This is because even when an aggregate is generated at a fixed ratio, the amount of foreign substance to be generated becomes larger as an increase in the area (A). Therefore, in the case where A/B becomes 300 or more, the ink jet recording system according to this embodiment can be more effectively used.

The use aspect of the ink tank also affects the generation of the foreign substances. For example, in the ink tank having the injection state described above, when the ratio (C/B) of the area (C) of the horizontal cross section inside the ink containing chamber 340 in the injection state and the area (B) of the cross section of the ink supply path 42 which supplies ink to the head 31 is large, discharge stability may not be sufficiently obtained for the same reason as above. For example, when the ratio (C/B) is 900 or more, the ink discharge stability tends to decrease. However, even in such a case, sufficient discharge stability can be obtained in the case of the ink jet recording system according to this embodiment employing the above-described ink jet ink. Therefore, in the case where the above-described ratio (C/B) becomes 900 or more, the ink jet recording system according to this embodiment can be more effectively used.

In the ink tank having the injection state and the use state described above, the area ratio (C/A) of the area (A) and the area (C) is preferably 2.5 or more. Due to the fact that the area ratio (C/A) is within the range above, the ink tank in the injection state becomes difficult to fall, and a user can stably inject the ink. Furthermore, since the area of the place where the ink tank is placed in the use state can be made small, the ink tank can be placed also in a narrow space. Even in an ink jet recording system having the ink tank in which the area ratio (C/A) becomes 2.5 or more, sufficient discharge stability can be obtained in the case of the ink jet recording system according to this embodiment.

The horizontal cross section inside the ink containing chamber 340 refers to one having the largest area among the horizontal cross sections inside the ink containing chamber 340. The cross section of the ink supply path 42 refers to one having the largest area among the cross sections of the ink supply path 42 orthogonal to the flowing direction of the ink passing through the ink supply path.

When the ink in the ink containing chamber 340 is consumed, the air of the air containing chamber 330 is introduced as air bubbles G into the ink containing chamber 340 through the liquid chamber communication path 350. More specifically, in the ink containing chamber 340 of the ink tank 44, the atmosphere introduced through the air introduction flow path contacts the ink injected through the ink flow path. Thus, the ink liquid surface LF of the ink containing chamber 340 is lowered. On the other hand, since the height of the atmosphere contact liquid surface LA contacting the atmosphere is maintained at a fixed height, the hydraulic head difference d1 is maintained at a fixed difference. More specifically, by the predetermined suction force of the head 31, the ink can be stably supplied to the head 31 from the ink tank 44 in terms of ink amount.

EXAMPLES

Hereinafter, the invention is more specifically described with reference to Examples and Comparative Examples but the invention is not limited to these Examples.

1. Used Materials

Main materials used in the following Examples and Comparative Examples are as follows.
Coloring Material
Cyan
AB9: C.I. Acid Blue 9
DB199: C.I. Direct Blue 199
DB86: C.I. Direct Blue 86
Magenta
AR249: C.I. Acid Red 249
RR141: C.I. Reactive Red 141
DR227: C.I. Direct Red 227
Yellow
DY23: C.I. Direct Yellow 23
DY86: C.I. Direct Yellow 86
DY132: C.I. Direct Yellow 132
Surfactant
1. Alkylene Oxide Adduct of Acetylene Glycol Having 12 or More Carbon Atoms in Main Chain
SAA1: Manufactured by Nisshin Chemical Co., Ltd.; Olfine EXP4300: Number of carbon atoms in the main chain of 12, Ethylene oxide was added, 2,5,8,11-tetramethyl-6-dodecyn-5,8-diol ethoxylate
2. Acetylene Glycol Having 10 or More Carbon Atoms in Main Chain
SAA2: Manufactured by Air Products INC.; Surfynol DF110D: Number of carbon atoms in the main chain of 12, Ethylene oxide was not added, 2,5,8,11-tetramethyl 6-dodecyn-5,8-diol
SAA3: Manufactured by Air Products INC.; Surfynol 104PG50: Numbe of carbon atoms in the main chain of 10, Ethylene oxide was not added, 2,4,7,9-tetramethyl-5-decyne-4,7-diol
3. Other Acetylene Glycol Compounds
SAA4: Manufactured by Nisshin Chemical Co., Ltd.; Olfine E1010: Number of carbon atoms in the main chain of 10, Additional mole number of ethylene oxide of 10, Ethoxylate of 2,4,7,9-tetramethyl-5-decyne-4,7-diol
SAA5: Manufactured by Nisshin Chemical Co., Ltd.; Olfine E1004: Number of carbon atoms in the main chain of 10, Additional mole number of ethylene oxide of 4, Ethoxylate of 2,4,7,9-tetramethyl-5-decyne-4,7-diol
SAA6: Manufactured by Nisshin Chemical Co., Ltd.; Olfine 82W: Number of carbon atoms in the main chain of 8, Ethylene oxide was not added, 3,6-dimethyl-4-octyne-3,6-diol
Polyoxy alkylene alkyl ether
POAAE1(HLB value 15.0): Manufactured by Dai-Ichi Kogyo Seiyaku Co., Ltd.; NOIGEN DL-0415
POAAE1 is represented by the following general formula (A). In Formula (A), R represents alkyl having 12 carbon atoms, w, y, x, and z are numbers satisfying w+y=15 and x+z=4.

$$RO(C_2H_4O)_w(C_3H_6O)_x(C_2H_4O)_y(C_3H_6O)_zH \quad (A)$$

POAAE2(HLB value 12.0): Manufactured by Dai-Ichi Kogyo Seiyaku Co., Ltd.; NOIGEN ET-116B
POAAE2 is represented by the following general formula (B). In Formula (B), R represents alkyl having 12 carbon atoms.

$$RO(C_2H_4O)_7(C_3H_6O)_5H \quad (B)$$

POAAE3(HLB value 10.9): Manufactured by Dai-Ichi Kogyo Seiyaku Co., Ltd.; NOIGEN ET-106A
POAAE3 is represented by the following general formula (C). In Formula (C), R represents alkyl having 12 carbon atoms.

$$RO(C_2H_4O)_5(C_3H_6O)_4H \quad (C)$$

Organic Solvent
Triethylene glycol
Triethylene glycol monobutyl ether (hereinafter also indicated as "TEGmBE")
Propylene glycol
Dipropylene glycol
Glycerin
Triethanolamine Examples 1 to 16, Comparative Examples 1 to 11

2. Preparation of Ink Set

Ink sets each having a cyan ink, a magenta ink, and a yellow ink of the materials and the compositions shown in the following Tables 1 and 2 were prepared. Specifically, SAA1, SAA2, and SAA3 which were warmed to 50° C. were placed in a container with a stirrer. Then, a C coloring material in the case of a cyan ink, a M coloring material in the case of a magenta ink, and a Y coloring material in the case of a yellow ink were further placed therein. Thereafter, polyoxy alkylene alkyl ether was gradually put therein and mixed therewith under stirring, the mixture was continuously stirred for 2 hours, and then the mixture was cooled to room temperature. After cooling, the mixture was filtered through a 200 mesh filter cloth, thereby preparing each ink. In the following Tables 1 and 2, the unit of the numerical values (numerical values in the brackets in Table 2) is % by mass and the total is 100.0% by mass.

TABLE 1

| Components | | Content |
|---|---|---|
| Colorant | | Shown in Table 2 |
| Alkylene oxide adduct of acetylene glycol having 12 or more carbon atoms in main chain | | Shown in Table 2 |
| Acetylene glycol having 10 or more carbon atoms in main chain | | Shown in Table 2 |
| Polyoxy alkylene alkyl ether | | Shown in Table 2 |
| Other components | Triethylene glycol | 10 |
| | Triethylene glycol monobutyl ether | 8 |
| | Propylene glycol | 1 |
| | Dipropylene glycol | 1 |
| | Glycerin | 10 |
| | Triethanolamine | 0.5 |
| Water | | Balance |
| Total | | 100 |

TABLE 2

|  | Coloring material | | | Alkylene oxide adduct of acetylene glycol having 14 or more carbon atoms in main chain Type (% by mass) | Acetylene glycol having 12 or more carbon atoms in main chain Type (% by mass) | Polyoxy alkylene alkyl ether Type (% by mass) |
|---|---|---|---|---|---|---|
|  | C coloring material (% by mass) | M coloring material (% by mass) | Y coloring material (% by mass) |  |  |  |
| Example 1 | DB199(4) | RR141(2) | DY86(2.5) | SAA1(0.15) | SAA2(0.15) | POAAE1(0.15) |
| Example 2 | DB199(4) | RR141(2) | DY132(2.5) | SAA1(0.15) | SAA2(0.15) | POAAE1(0.15) |
| Example 3 | AB9(4) | AR249(2) | DY86(2.5) | SAA1(0.15) | SAA2(0.15) | POAAE1(0.15) |
| Example 4 | AB9(4) | AR249(2) | DY132(2.5) | SAA1(0.15) | SAA2(0.15) | POAAE1(0.15) |
| Example 5 | DB199(4) | AR249(2) | DY86(2.5) | SAA1(0.15) | SAA2(0.15) | POAAE1(0.15) |
| Example 6 | DB199(4) | AR249(2) | DY132(2.5) | SAA1(0.15) | SAA2(0.15) | POAAE1(0.15) |
| Example 7 | AB9(4) | RR141(2) | DY86(2.5) | SAA1(0.15) | SAA2(0.15) | POAAE1(0.15) |
| Example 8 | AB9(4) | RR141(2) | DY132(2.5) | SAA1(0.15) | SAA2(0.15) | POAAE1(0.15) |
| Comparative Example 1 | DB86(4) | RR141(2) | DY86(2.5) | SAA1(0.15) | SAA2(0.15) | POAAE1(0.15) |
| Comparative Example 2 | DB199(4) | DR227(2) | DY86(2.5) | SAA1(0.15) | SAA2(0.15) | POAAE1(0.15) |
| Comparative Example 3 | DB199(4) | RR141(2) | AY23(2.5) | SAA1(0.15) | SAA2(0.15) | POAAE1(0.15) |
| Example 9 | DB199(4) | RR141(2) | DY86(2.5) | SAA1(0.15) | SAA2(0.15) | POAAE2(0.15) |
| Example 10 | DB199(4) | RR141(2) | DY86(2.5) | SAA1(0.15) | SAA2(0.15) | POAAE3(0.15) |
| Example 11 | DB199(4) | RR141(2) | DY86(2.5) | SAA1(0.15) | SAA3(0.15) | POAAE2(0.15) |
| Example 12 | DB199(4) | RR141(2) | DY86(2.5) | SAA1(0.15) | SAA3(0.15) | POAAE3(0.15) |
| Example 13 | DB199(4) | RR141(2) | DY86(2.5) | SAA1(0.3) | SAA2(0.1) | POAAE1(0.05) |
| Example 14 | DB199(4) | RR141(2) | DY86(2.5) | SAA1(0.3) | SAA2(0.3) | POAAE1(0.3) |
| Example 15 | DB199(4) | RR141(2) | DY86(2.5) | SAA1(0.4) | SAA2(0.3) | POAAE1(0.3) |
| Example 16 | DB199(4) | RR141(2) | DY86(2.5) | SAA1(0.3) | SAA2(0.4) | POAAE1(0.3) |
| Comparative Example 4 | DB199(4) | RR141(2) | DY86(2.5) | SAA1(0.15) | — | — |
| Comparative Example 5 | DB199(4) | RR141(2) | DY86(2.5) | — | SAA2(0.15) | — |
| Comparative Example 6 | DB199(4) | RR141(2) | DY86(2.5) | — | — | POAAE1(0.15) |
| Comparative Example 7 | DB199(4) | RR141(2) | DY86(2.5) | SAA1(0.15) | SAA2(0.15) | — |
| Comparative Example 8 | DB199(4) | RR141(2) | DY86(2.5) | SAA1(0.15) | — | POAAE1(0.15) |
| Comparative Example 9 | DB199(4) | RR141(2) | DY86(2.5) | SAA1(0.15) | SAA6(0.15) | POAAE1(0.15) |
| Comparative Example 10 | DB199(4) | RR141(2) | DY86(2.5) | SAA2(0.15) | SAA5(0.15) | POAAE1(0.15) |
| Comparative Example 11 | DB199(4) | AR249(2) | DY86(2.5) | SAA3(0.15) | SAA4(0.15) | POAAE1(0.15) |

3. Measurement and Evaluation Method 3.1. Measurement of Dissolved Nitrogen Amount of Ink The dissolved nitrogen amount of the inks of each ink set was measured using 6890N network GC manufactured by Agilent Technologies. The measurement results are shown in Table 3 below. The "dissolved nitrogen amount" in Table 3 below represents the amount of nitrogen dissolved in an ink composition and the unit is ppm.

3.2. Evaluation of Dissolution Stability

It was visually observed whether or not the material components can be uniformly dissolved (dispersed) for each of the cyan ink, the magenta ink, and the yellow ink. The evaluation criteria are as follows. The evaluation results are shown in Table 3 below.

Evaluation Criteria

○: In all the inks, the material components were uniformly dissolved (dispersed) and floating matter which was not melted and remained was not observed.

×: In at least one ink, the material components were not dissolved (dispersed) and a substance which was not melted and remained was observed as floating matter.

3.3. Evaluation of Storage Stability

Each of the cyan ink, the magenta ink, and the yellow ink was portioned into a glass bottle with a lid having a capacity of 20 mL, and then allowed to stand at 70° C. for 1 week. The liquid surface of the ink was observed to visually observe the presence of floating matter. Furthermore, when the ink after allowed to stand was filtered with a filter with a pore diameter of 10 μm, the presence or absence of collected matter (filtered matter) was confirmed. The evaluation criteria are as follows. The evaluation results are shown in Table 3 below.

Evaluation Criteria

○: In all the inks, floating matter derived from the ink components was not observed and collected matter was not obtained.

Δ: In at least one ink, floating matter derived from the ink components was observed but collected matter was not obtained (No problems in practical use).

×: Collected matter was obtained in at least one ink.

3.4. Evaluation of Initial Filling Properties

An ink tank of an ink jet printer (L100 [product name], manufactured by Seiko Epson Corp.) was charged with each prepared ink set. Initial filling operation to a head was performed according to the initial filling sequence prescribed in L100. Thereafter, a nozzle check was performed in order to confirm whether or not the ink was able to be discharged from all the nozzles of the head. When there were nozzles which were not able to discharge the ink, the head was cleaned (suction of the ink in the nozzles), and then the nozzle check was performed again. Based on the number of times of the cleaning required until the ink was able to be discharged from all the nozzles, the initial filling properties were evaluated based on the following evaluation criteria. The evaluation results are shown in Table 3 below.

Evaluation Criteria

○: The ink was discharged from all the nozzles only by the initial filling sequence.

Δ: The number of times of the cleaning required until the ink was able to be discharged from all the nozzles was 1 time.

×: The number of times of the cleaning required until the ink was able to be discharged from all the nozzles was 2 times or more.

3.5. Evaluation of Continuous Printing Stability

After confirming that the ink was able to be discharged from all the nozzles of the head by the "Evaluation of initial filling properties" above, the continuous printing stability was evaluated by printing images of Duty 70% using each ink composition and A4 size plain paper (P paper [product name], manufactured by Fuji Xerox). As the number of printed sheets, continuous printing of 500 sheets was performed twice to give 1,000 sheets in total. Thereafter, the nozzle check was performed and the continuous printing stability was evaluated based on the number of nozzles in which nozzle omission occurred according to the following evaluation criteria. The evaluation results are shown in Table 3 below.

Evaluation Criteria

○: The number of nozzles in which nozzle omission occurred was 1 or less.
Δ: The number of nozzles in which nozzle omission occurred was 2.
×: The number of nozzles in which nozzle omission occurred was 3 or more.

3.6. Evaluation of Color Reproduction Properties

An ink tank of an ink jet printer (L100 [product name], manufactured by Seiko Epson Corp.) was charged with each prepared ink set, and a color chart image was printed on a recording medium (Photograph paper (Glossy), Model number "kA420PSK", manufactured by Seiko Epson Corp.). The L* value, the a* value, and the b* value were measured for the obtained standard color chart image using a colorimeter (Product name "Xrite i1", manufactured by Xrite). From these values, a value (GAMUT value) of the L*a*b* color reproduction range volume of each ink set was calculated.

Evaluation Criteria

○: The GAMUT value was 11,000 or more.
Δ: The GAMUT value was 10,000 or more and less than 11,000.
×: The GAMUT value was less than 10,000.

3.7. Evaluation of Clogging

A cartridge (Magenta chamber) exclusive for an ink jet printer PM-G800 (manufactured by Seiko Epson Corp.) was charged with each prepared ink set, a solid image was continuously recorded for 10 minutes on a recording medium exclusive for ink jet (Photograph paper <Glossy>; manufactured by Seiko Epson Corp., Model number: kA420PSKR), and then it was confirmed that all the nozzles normally discharged the ink. Thereafter, in order to accelerate the dry state in nozzles in a state where the ink cartridge was attached, the recording head was allowed to stand in a 40° C. environment for 2 weeks in a state where the recording head was removed from a head cap. Then, after allowed to stand, the cleaning operation was repeated until all the nozzles discharged the ink in the same manner as the first stage. Then, the ease of recovering was evaluated based on the following judgment criteria, and then the evaluation results are shown in Table 3 below.

Evaluation Criteria

○: By 1 to 7 cleaning operations, recording defects, such as fading and omission, were removed.
×: Recording defects, such as fading and omission, were not removed even by 8 or more cleaning operations.

3.8. Evaluation of Moisture Resistance

White characters (those formed as white characters by performing recording in ink in a region other than the characters: Font size: 14 and 18 pt, Font type: MS Gothic) were recorded with each ink composition using the printer, the cartridge, and the recording medium described above. The obtained images were allowed to stand under an environment of 40° C. and RH 85% for 3 days, and then the moisture resistance was evaluated based on the following judgment criteria. The evaluation results are shown in Table 3 below.

Evaluation Criteria

○: Collapse (blurring) of the outline portion of the characters and coloring of the white portion were not observed in each ink.
Δ: Although coloring of the white portion was not observed in each ink, collapse (blurring) of the outline portion of the characters was observed.
×: Both collapse (blurring) of the outline portion of the characters and coloring of the white portion were observed in each ink.

TABLE 3

|  | Dissolved nitrogen amount | Dissolution stability | Storage stability | Initial filling properties | Continuous printing stability | Clogging resistance | Color reproduction properties | Moisture resistance |
|---|---|---|---|---|---|---|---|---|
| Example 1 | 8.7 | ○ | ○ | ○ | ○ | ○ | ○ | ○ |
| Example 2 | 8.7 | ○ | ○ | ○ | ○ | ○ | ○ | Δ |
| Example 3 | 8.7 | ○ | ○ | ○ | ○ | ○ | ○ | Δ |
| Example 4 | 8.7 | ○ | ○ | ○ | Δ | ○ | ○ | Δ |
| Example 5 | 8.7 | ○ | ○ | ○ | ○ | ○ | ○ | Δ |
| Example 6 | 8.7 | ○ | ○ | ○ | ○ | ○ | ○ | Δ |
| Example 7 | 8.7 | ○ | ○ | ○ | ○ | ○ | ○ | Δ |
| Example 8 | 8.7 | ○ | ○ | ○ | ○ | ○ | ○ | Δ |
| Comparative Example 1 | 8.7 | ○ | ○ | ○ | ○ | X | ○ | ○ |
| Comparative Example 2 | 8.7 | ○ | ○ | ○ | ○ | ○ | X | ○ |
| Comparative Example 3 | 8.7 | ○ | ○ | ○ | ○ | ○ | X | X |
| Example 9 | 8.2 | ○ | ○ | ○ | ○ | ○ | ○ | ○ |
| Example 10 | 7.7 | ○ | ○ | Δ | Δ | ○ | ○ | ○ |
| Example 11 | 7.8 | ○ | ○ | ○ | ○ | ○ | ○ | ○ |
| Example 12 | 8.3 | ○ | ○ | ○ | ○ | ○ | ○ | ○ |
| Example 13 | 8.7 | ○ | ○ | ○ | Δ | ○ | ○ | ○ |
| Example 14 | 8.7 | ○ | ○ | ○ | ○ | ○ | ○ | ○ |
| Example 15 | 8.7 | ○ | Δ | ○ | ○ | ○ | Δ | ○ |
| Example 16 | 8.7 | ○ | Δ | ○ | ○ | ○ | Δ | ○ |
| Comparative Example 4 | 8.1 | X | X | X | X | X | ○ | ○ |
| Comparative Example 5 | 8.2 | X | X | X | X | X | ○ | ○ |
| Comparative Example 6 | 8.2 | ○ | ○ | X | X | ○ | ○ | ○ |
| Comparative Example 7 | 8.4 | X | X | X | X | X | ○ | ○ |
| Comparative Example 8 | 8.4 | ○ | ○ | X | X | ○ | ○ | ○ |
| Comparative Example 9 | 8 | ○ | X | X | X | X | ○ | ○ |
| Comparative Example 10 | 8.3 | ○ | ○ | X | X | ○ | ○ | ○ |
| Comparative Example 11 | 7.9 | ○ | ○ | X | X | ○ | ○ | ○ |

The above results showed that the ink jet ink set according to an aspect of the invention is excellent in initial filling properties, continuous printing stability, color reproduction properties, and clogging resistance. On the other hand, Comparative Examples 4 to 11 not containing any one of the alkylene oxide adduct of the acetylene glycol having 12 or more carbon atoms in the main chain, the acetylene glycol having 10 or more carbon atoms in the main chain, and the polyoxy alkylene alkyl ether were inferior in initial filling properties and continuous printing stability. Comparative Examples 1 to 3 not containing the coloring material specified in an aspect of the invention were inferior in clogging resistance or color reproduction properties.

The entire disclosure of Japanese Patent Application No. 2013-020170, filed Feb. 5, 2013 is expressly incorporated by reference herein.

What is claimed is:

1. An ink jet ink set, at least comprising:
a cyan ink, a magenta ink, and a yellow ink,
the cyan ink containing at least either one of C.I. Acid Blue 9 or C.I. Direct Blue 199,
the magenta ink containing at least either one of C.I. Acid Red 249 or C.I. Reactive Red 141,
the yellow ink containing at least either one of C.I. Direct Yellow 86 or C.I. Direct Yellow 132, and
the cyan ink, the magenta ink, and the yellow ink all containing an alkylene oxide adduct of acetylene glycol having 12 or more carbon atoms in a main chain, acetylene glycol having 10 or more carbon atoms in a main chain, and polyoxy alkylene alkyl ether.

2. The ink jet ink set according to claim 1, wherein the polyoxy alkylene alkyl ether has a HLB value of 11 to 16.

3. The ink jet ink set according to claim 1, wherein the alkylene oxide adduct of the acetylene glycol having 12 or more carbon atoms in the main chain contains an ethylene oxide adduct of the acetylene glycol having 12 or more carbon atoms in the main.

4. The ink jet ink set according to claim 1, wherein the polyoxy alkylene alkyl ether is contained in a proportion of 0.10 to 0.50 in terms of mass ratio when a total content of the alkylene oxide adduct of the acetylene glycol having 12 or more carbon atoms in the main chain and the acetylene glycol having 10 or more carbon atoms in the main chain is 1.

5. The ink jet ink set according to claim 1, wherein the alkylene oxide adduct of the acetylene glycol having 12 or more carbon atoms in the main chain has a HLB value of 8 to 15.

6. The ink jet ink set according to claim 1, wherein the acetylene glycol having 10 or more carbon atoms in the main chain has a HLB value of 7 or less.

7. An ink jet recording system, comprising:
an ink containing vessel containing the inks of the ink jet ink set according to claim 1;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

8. An ink jet recording system, comprising:
an ink containing vessel containing the ink of the ink jet ink set according to claim 2;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

9. An ink jet recording system, comprising:
an ink containing vessel containing the ink of the ink jet ink set according to claim 3;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

10. An ink jet recording system, comprising:
an ink containing vessel containing the ink of the ink jet ink set according to claim 4;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

11. An ink jet recording system, comprising:
an ink containing vessel containing the ink of the ink jet ink set according to claim 5;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

12. An ink jet recording system, comprising:
an ink containing vessel containing the ink of the ink jet ink set according to claim 6;
an ink jet recording head which discharges the inks; and
an ink supply path which supplies the inks from the ink containing vessel to the head, and
the ink containing vessel having an ink containing chamber for containing the inks and an air introduction flow path which introduces air into the ink containing chamber through the inks contained in the ink containing chamber.

13. The ink jet recording system according to claim 7, wherein a ratio (A/B) of
an area (A) of a horizontal cross section inside the ink containing chamber when supplying the inks to the head and
an area (B) of a cross section of the ink supply path is 300 or more.

14. The ink jet recording system according to claim 7, wherein a ratio (C/B) of
an area (C) of a horizontal cross section inside the ink containing chamber when supplying the inks to the ink containing chamber and
the area (B) of the cross section of the ink supply path is 900 or more.

15. The ink jet recording system according to claim 7, wherein a ratio (C/A) of
the area (C) of the horizontal cross section inside the ink containing chamber when supplying the inks to the ink containing chamber and the area (A) of the horizontal cross section inside the ink containing chamber when supplying the inks to the head is 2.5 or more.

* * * * *